US006279785B1

(12) United States Patent
Bonningue

(10) Patent No.: US 6,279,785 B1
(45) Date of Patent: Aug. 28, 2001

(54) MEMBRANE PUMP FOR A RECEPTACLE

(75) Inventor: Philippe Bonningue, Paris (FR)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 09/629,161

(22) Filed: Jul. 31, 2000

(30) Foreign Application Priority Data

Aug. 6, 1999 (FR) .............................................. 99 10272

(51) Int. Cl.[7] .............................................. G01F 11/00

(52) U.S. Cl. .............................................. 222/321.7; 222/341

(58) Field of Search .............................................. 222/321.7, 387, 222/341

(56) References Cited

U.S. PATENT DOCUMENTS

| | | | |
|---|---|---|---|
| 4,875,604 | * 10/1989 | Czech | 222/321.7 |
| 5,267,673 | 12/1993 | Crosnier et al. . | |
| 5,918,778 | * 7/1999 | Schultz | 222/321.7 |

FOREIGN PATENT DOCUMENTS

EP 0 470 906 A1 2/1992 (EP) .

* cited by examiner

*Primary Examiner*—Philippe Derakshani
(74) *Attorney, Agent, or Firm*—Oliff & Berridge, PLC

(57) ABSTRACT

A pump for mounting on a receptacle comprises two portions which are movable with respect to each other defining between them a variable volume pump chamber; the first part comprises a wall defining a fluid inlet passage, via which the fluid contained in the receptacle can gain entry into the pump chamber; the second part comprises a wall defining a fluid outlet passage via which the fluid contained in the pump chamber can leave. The pump comprises a membrane having a first portion disposed on the outer side of the wall defining the inlet passage, such that pressure in the pump chamber applies said portion to said wall to obstruct the inlet passage when the volume of the pump chamber is reduced, and a second portion disposed on the inner side of the wall defining the outlet passage, such that an underpressure in the pump chamber applies said portion to said wall to obstruct said outlet passage when the volume of the pump chamber increases.

18 Claims, 4 Drawing Sheets

MEMBRANE PUMP FOR A RECEPTACLE

The present invention relates to a pump for mounting on a receptacle, the pump being of the type comprising two parts which are movable with respect to each other defining between them a variable-volume pump chamber, the first part comprising a wall defining a fluid inlet passage, via which the fluid contained in the receptacle can reach the pump chamber, the second part comprising a wall defining a fluid outlet passage via which the fluid contained in the pump chamber can leave, the pump comprising a membrane having a first portion disposed on the outer side of the wall defining the inlet passage, such that pressure in the pump chamber applies said first portion to said wall to obstruct said inlet passage when the volume of the pump chamber is reduced.

BACKGROUND OF THE INVENTION

U.S. Pat. No. 5,267,673 describes a pump of the above type. In that known pump, the membrane comprises a portion disposed on the outer side of the wall defining the outlet passage and is deflected from it under the effect of an overpressure in the pump chamber.

With such a configuration, the fluid is not dispensed along the pump axis, which can be a problem when the pump is intended to be mounted over a distribution nozzle.

OBJECTS AND SUMMARY OF THE INVENTION

There is a need to provide a pump of that type which is both cheaper to manufacture and which functions reliably.

In the novel pump of the invention the membrane comprises a second portion disposed on the inner side of the wall defining the outlet passage, such that an underpressure in the pump chamber applies said second portion to said wall to obstruct said outlet passage when the volume of the pump chamber increases.

The invention thus provides a pump comprising a reduced number of component parts which is easy to manufacture and which functions reliably.

Further, the fluid can be dispensed along the axis of the pump, which can be advantageous.

In a particular embodiment, the first part of the pump is stationary and integral with the receptacle.

In a preferred embodiment, the membrane is integral with the first part of the pump and the second portion of the membrane can be displaced axially with respect to the wall defining the outlet passage, said passage being obstructed when the volume of the pump chamber increases.

In a variant, the membrane is integral with the second part of the pump and the first portion of the membrane can displace axially with respect to the wall defining the inlet passage and obstruct said passage when the volume of the pump chamber reduces.

In a further preferred embodiment, the first and second portions of the membrane are tubular.

Preferably, the first and second portions of the membrane form a cylinder, advantageously a symmetrical cylindrical body of revolution.

The membrane is easier to assemble as no angular positioning is required.

In a particular embodiment, the wall defining the inlet passage is tubular and the first portion of the membrane is disposed around it.

In a still further particular embodiment, the wall defining the outlet passage is also tubular and the second portion of the membrane is inserted inside it.

In a yet still further particular embodiment, the wall defining the outlet passage is a cylindrical body of revolution, as is the outer surface of the second portion of the membrane facing it.

In a yet still further particular embodiment, the wall defining the inlet passage is a cylindrical body of revolution, and comprises at least one lateral opening, and the inner surface of the first portion of the membrane facing it is a cylindrical body of revolution.

In a preferred embodiment, the membrane comprises a transverse partition between its first and second portions.

In a yet still further preferred embodiment, said transverse partition bears axially on the wall defining the inlet passage.

Advantageously, a resilient return means is provided to return the second part of the pump to an initial position in which the volume of the pump chamber is a maximum.

This resilient return means is preferably formed in a single piece by molding a plastics material with the membrane.

This avoids the need for a metal helical spring which would result in extra cost and could cause problems regarding compatibility with the fluid to be distributed.

In a particular embodiment, the resilient return means comprises a flange against which the wall defining the outlet passage can bear, and a transverse partition which can stretch elastically when the wall defining the outlet passage is displaced.

In a particular embodiment, the membrane comprises a symmetrical body of revolution with an axial cross section in the shape of an H.

In a yet still further particular embodiment, the edge of the membrane comprises an L-shaped annular flange against which the wall defining the outlet passage bears.

Such a membrane can readily be produced by molding.

The invention also provides a receptacle equipped with a pump in accordance with the invention.

BRIEF DESCRIPTION OF THE DRAWINGS

The invention will be better understood on reading the description below of non limiting examples, and on examining the accompanying drawings in which.

MORE DETAILED DESCRIPTION

Figure 1:
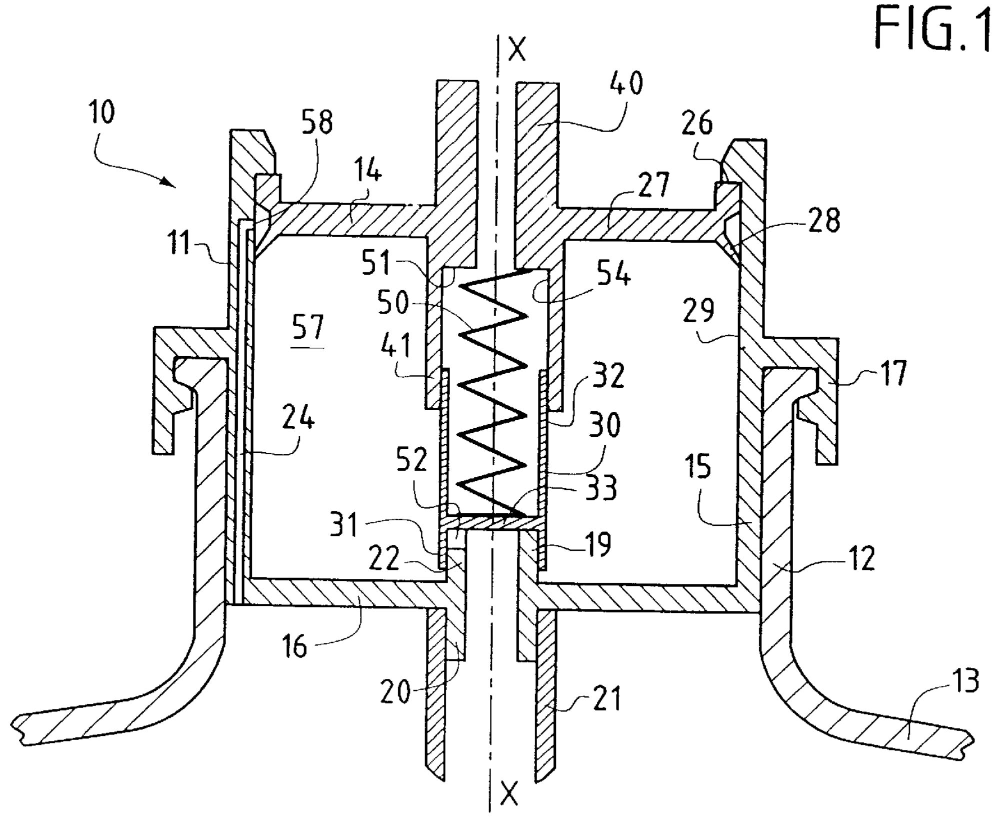
FIG. 1 is a diagrammatic view of an axial cross section through a pump showing a first embodiment of the invention.
Figure 2:
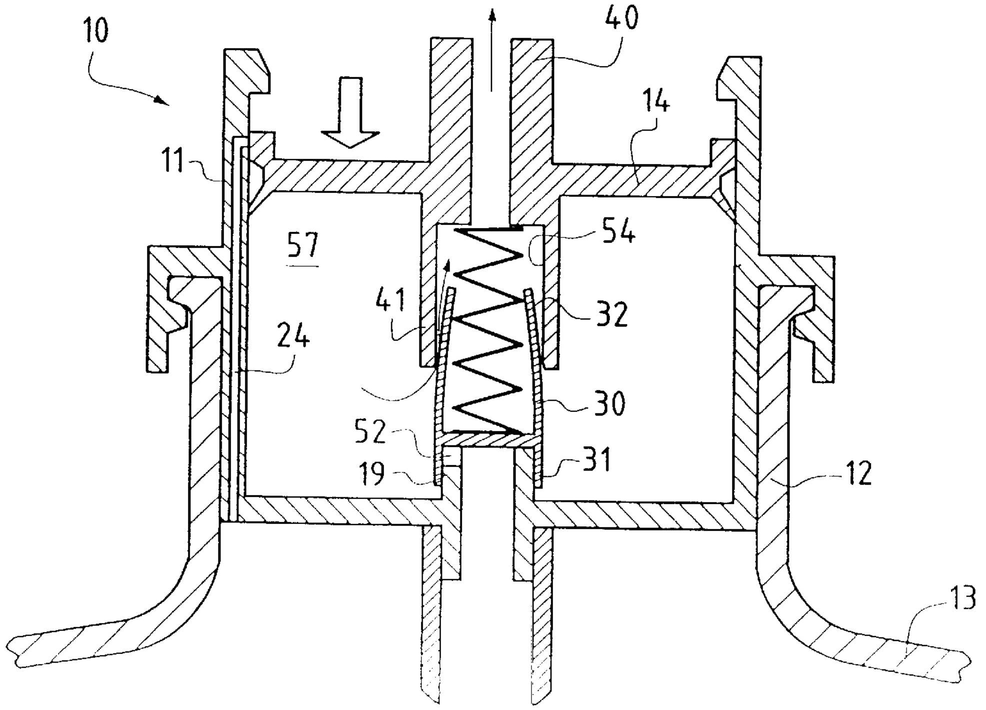
FIG. 2 is an analogous view to FIG. 1, illustrating the operation of the pump when the volume in the pump chamber is reduced.
Figure 3:
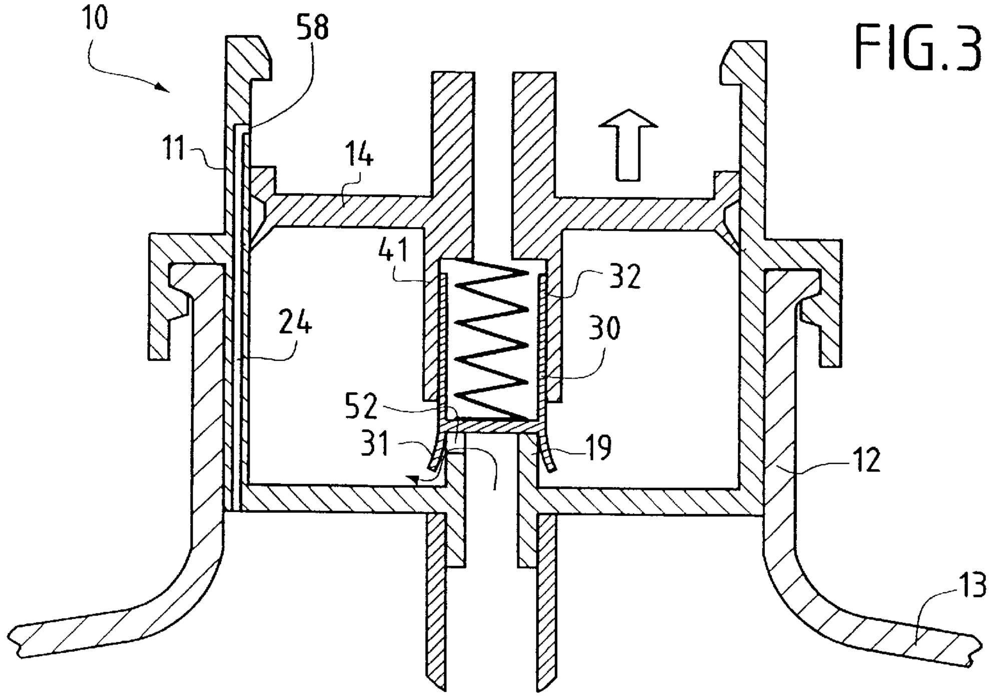
FIG. 3 is an analogous view to FIG. 1, illustrating the operation of the pump when the volume in the pump chamber is increased.

Pump 10 shown in FIGS. 1 to 3 comprises a stationary part 11 for securing to the neck 12 of a receptacle 13 and a movable part 14 which can be displaced along the axis X of neck 12 with respect to the stationary part 11.

Stationary part 11 and movable part 14 can be produced from rigid or semi-rigid thermoplastics material.

Stationary part 11 comprises a tubular body 15 sealingly engaged in neck 12 of receptacle 13, this body 15 being closed at its lower portion by a bottom wall 16 and extended towards the exterior half way up by an annular flange 17 snap-fitted onto neck 12.

The center of bottom wall 16 is traversed by a duct 19 with axis X the lower part 20 of which receives a dip tube 21 and the upper part 22 of which acts as the mount for a membrane 30, as described below.

A channel 24 is formed in the thickness of the wall of body 15 to allow air to enter as the pump is operated, as described below.

The radially inner surface 29 of the upper portion of body 15 carries a shoulder 26 which limits the upward motion of movable part 14.

This part comprises a transverse wall 27 provided at its edge with two annular sealing lips 28 mounted so as to seal and slide in the direction of axis X on the surface 29 of body 15.

When movable part 14 is in its initial position, channel 24 opens between the annular lips 28 via an orifice 58.

A distribution nozzle 40 projects upwardly from transverse wall 27.

This nozzle 40 is of any shape which is suitable for distributing the fluid or for mounting on the movable part 14 of a distribution head.

A tubular skirt 41 with axis X projects downwardly beneath transverse wall 27.

The membrane 30 is produced from any flexible material, preferably an elastomer and in the embodiment described, it is a symmetrical body of revolution with an axial cross section in the shape of an H.

Any suitable material can be used to produce the membrane, for example an elastomer as in the example described. EMA or PE can be used, for example.

Membrane 30 comprises a first portion 31 and a second portion 32 which are cylindrical bodies of revolution about axis X, separated by a transverse partition 33 perpendicular to axis X, the lower face of this partition resting on the upper extremity of duct 19.

The first portion 31 of membrane 30 is shorter than the second portion 32, the length of the latter being greater than the downward displacement path of movable part 14 during distribution of a dose.

The upper extremity of a helical spring 50, operating in compression, bears on a shoulder 51 formed where tubular skirt 41 meets transverse wall 27 and its lower extremity bears on the upper face of partition 33, thus keeping the latter applied against duct 19.

The first portion 31 of membrane 30 has a radially inner surface, which in the rest position comes into bearing contact with the radially outer surface of duct 19, which is also a cylindrical body of revolution, traversed by a lateral opening 52.

In the rest position, the radially outer surface of second portion 32 of the membrane 30, which is a cylindrical body of revolution about axis X, comes into bearing contact with the radially inner surface 54 of tubular skirt 41, which is also a cylindrical body of revolution about axis X.

The movable part 14 defines a variable volume pump chamber 57 with the stationary part 11, duct 19 defining a passage for supplying fluid to this pump chamber 57, and tubular skirt 41 defines an outlet passage.

Pump 10 functions as follows.

It is assumed that pump 10 is primed and that pump chamber 57 is full of fluid.

When the user presses on movable part 14 and displaces it downwardly, the volume of pump chamber 57 reduces, as illustrated in FIG. 2, and an overpressure is created in pump chamber 57.

Under the effect of this overpressure, the first portion 31 of membrane 30 is closely applied against duct 19 and thus obstructs opening 52.

The second portion 32 of the membrane is radially inwardly deformed and a clearance is created between the radially inner surface 54 of tubular skirt 41 and the radially outer surface of the second portion 32 of membrane 30, allowing the fluid contained in pump chamber 57 to flow outside the pump via distribution nozzle 40.

During this phase of the distribution, the second portion 32 of the membrane may be driven into lateral skirt 41.

It should be noted that after a certain path of downward displacement of the movable wall 14, orifice 58 of channel 24 is located above the latter and communicates with the surrounding air.

When the user releases movable part 14, this latter is returned upwardly under the return action of spring 50.

The volume of pump chamber 57 increases and an underpressure is created inside it.

Under the effect of this underpressure, the radially outer surface of the second portion 32 of membrane 30 is closely applied to the radially inner surface of tubular skirt 41, thereby obstructing the outlet passage.

Still under the effect of said underpressure, the first portion 31 of membrane 30 can deflect away from duct 19 and thus allows the fluid contained in the receptacle to gain entry into pump chamber 57 via opening 52, as shown in FIG. 3.

It should be noted that channel 24 can ensure that air is taken into the receptacle to compensate for the fluid which leaves.

During the upward movement of movable part 14, the second portion 32 of membrane 30 sealingly slides inside tubular skirt 41.

Figure 5:
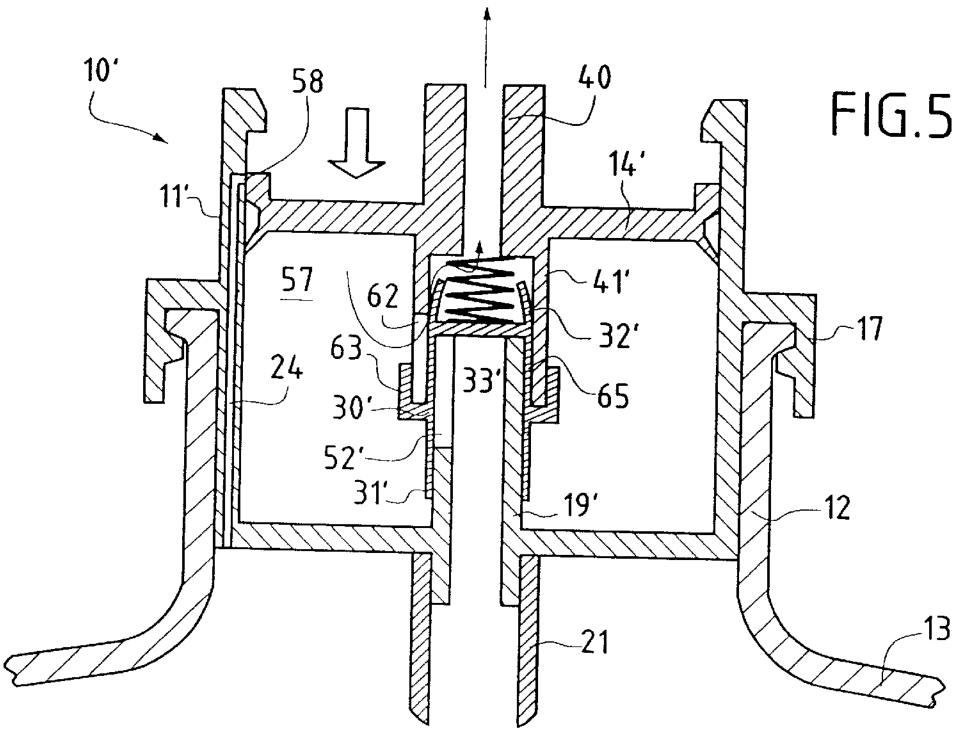
FIG. 5 is an analogous view to FIG. 4, illustrating the operation of the pump when the volume in the pump chamber is reduced.
Figure 6:
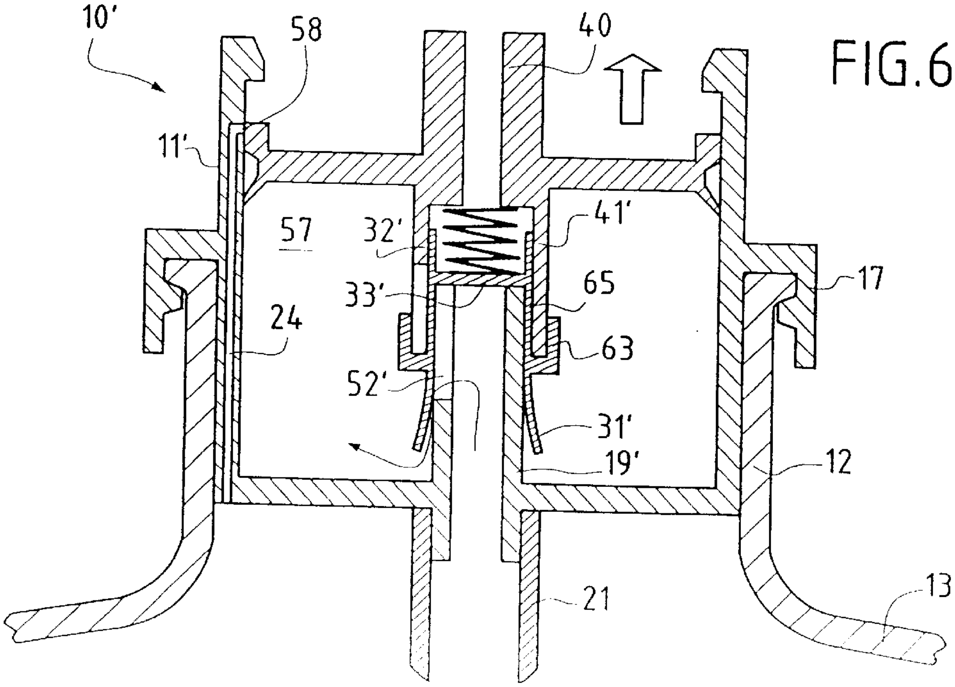
FIG. 6 is an analogous view to FIG. 4, illustrating the operation of the pump when the volume in the pump chamber is increased.

A pump 10', which differs from the preceding pump principally in the shape of the membrane, will now be described with reference to FIGS. 4 to 6.

The figures use the same reference numerals to designate elements which are identical or analogous to those described above.

Pump 10' comprises a stationary part 11' and a movable part 14' defining a variable volume pump chamber 57.

Mobile part 14' differs from part 14 described above in that tubular skirt 41' comprises a lateral opening 62.

Stationary part 11' comprises a duct 19' which is substantially longer than duct 19 described above.

Membrane 30' has a central portion which is a symmetrical body of revolution with an axial cross section in the shape of an H, with a first portion 31' engaged on duct 19', a transverse partition 33' bearing axially on said duct 19' and a second portion 32' engaged inside tubular skirt 41'.

Membrane 30' also comprises an annular flange 63 which is L-shaped in axial cross section, the lower extremity of tubular skirt 41' bearing against the bottom of this flange 63.

Figure 4:
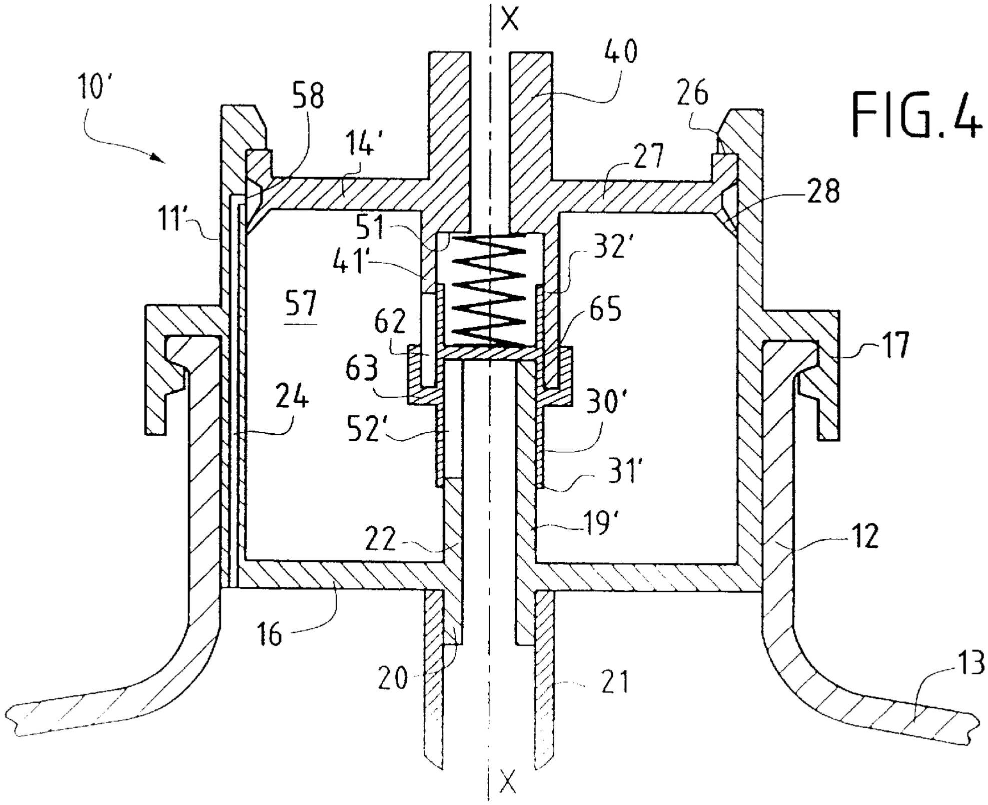
FIG. 4 is a diagrammatic view of an axial cross section in a variant.

When pump 10' is in the rest configuration shown in FIG. 4, membrane 30' is longer from the bottom of flange 63 to the upper extremity of second portion 32' than the distance to opening 62, such that this latter is obstructed by membrane 30'.

Membrane 30' is longer from partition 33' to the lower extremity of the first portion 31' than the distance to opening 52' such that this latter can also be obstructed.

The portion of membrane 30' constituted by partition 33' and the tubular portion 65 which extends axially between this partition and the bottom of flange 63 is pre-stressed so as to exert a return force maintaining the movable part 14' in bearing contact against shoulder 26 of stationary part 11'.

Pump 10' functions as follows.

When the user depresses movable part 14', partition 33' and tubular portion 65 of membrane 30' deform elastically, thus advantageously replacing the helical spring 50 of the preceding embodiment.

The volume of the pump chamber 57 reduces and the overpressure created therein causes the first portion 32' to deform inwardly.

The fluid can then gain entry through opening 62 to the outlet passage defined by tubular skirt 41'.

The overpressure in pump chamber 57 keeps the first portion 31' of membrane 30' closely applied against duct 19' so that opening 52' is obstructed.

During the downward motion of movable part 14', the first portion 31' of membrane 30' can slide sealingly on duct 19'.

When the user releases movable part 14', partition 33' and the tubular portion 65, which have been stretched, tend to regain their initial shape and return movable part 14' to its top abutting position.

The volume of pump chamber 57 increases and an underpressure is created therein.

This underpressure has the effect of closely applying the second portion 32' of membrane 30' against the radially inner surface of tubular skirt 41', thus closing opening 62.

That same underpressure also tends to deflect the first portion 31' of membrane 30' from duct 19', thereby liberating opening 52', via which the fluid contained in the receptacle can gain entry into pump chamber 57.

Channel 24 enables air to be taken in.

In the embodiments which have just been described, the membrane is integral with stationary part 11 or 11'.

Figure 8:
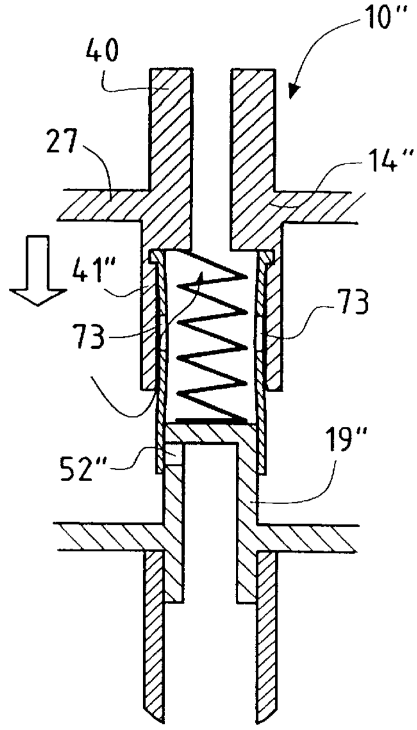
FIG. 8 is an analogous view to FIG. 7, illustrating the operation of the pump when the volume in the pump chamber is reduced.
Figure 9:
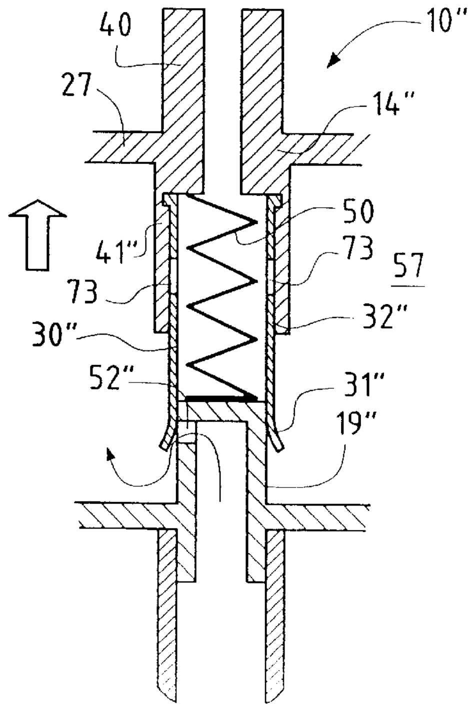
FIG. 9 is an analogous view to FIG. 7, illustrating the operation of the pump when the volume in the pump chamber is increased.

The scope of the invention also encompasses rendering the membrane integral with the movable part as will now be described with reference to FIGS. 7 to 9.

These figures show part of a pump 10" comprising a movable part 14", a stationary part 11" and a membrane 30".

Stationary part 11" comprises a duct 19" which differs from ducts 19 or 19' in that it is closed at its upper extremity by a wall 70.

Duct 19" comprises a lateral opening 52".

Mobile part 14" comprises a tubular skirt 41" which has no lateral opening.

Membrane 30" comprises a first portion 31" which can slide on duct 19" and a second portion 32" which is axially retained in tubular skirt 41".

The upper extremity of a helical spring 50" operating in compression bears against shoulder 51 and its lower extremity bears against upper wall 70 of duct 19".

The upper extremity of membrane 30" comprises a flange 71 which is outwardly directed and which is snap fitted into an annular groove 72 in tubular skirt 41".

Membrane 30" comprises lateral openings 73 traversing its second portion 32".

Tubular skirt 41" extends beyond these openings 73.

Figure 7:
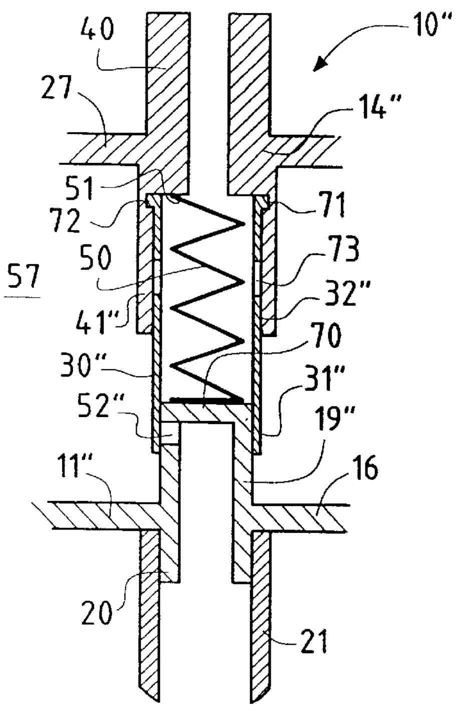
FIG. 7 is a partial diagrammatic view of an axial cross section through a pump in a variant.

When movable part 14" is in its top abutting position as shown in FIG. 7, the second portion 32" of membrane 30" is sealingly applied to the radially inner surface of tubular skirt 41" and openings 73 are obstructed.

The first portion 31" of membrane 30" is sealingly applied to duct 19" and opening 52" thereof is obstructed.

When the user presses down on movable part 14", an overpressure is created in pump chamber 57.

This overpressure maintains the first portion 31" of membrane 30" in a sealing bearing relationship with duct 19" so that opening 52" remains obstructed.

The overpressure in pump chamber 57 causes the second portion 32" of membrane 30" to deform inwardly and a clearance is created between tubular skirt 41" and membrane 30", this clearance enabling the compressed fluid in pump chamber 57 to reach distribution nozzle 40 via openings 73.

The first portion 31" can slide sealingly on duct 19" during the downward movement of movable part 14".

When the user releases the movable part 14", spring 50 returns it upwardly and an underpressure is created in pump chamber 57.

Under the effect of this underpressure, the portion of the second portion 32" of membrane 30" located beneath openings 73 is closely applied against tubular skirt 41" and isolate openings 73 of pump chamber 57.

The underpressure also causes the first portion 31" of membrane 30" to deflect from duct 19", and the fluid contained in the receptacle can gain entry into pump chamber 57 via opening 52".

In a variant which is not shown, membrane 30" is provided with a transverse partition in the manner of membranes 30 or 30' and has the shape of an H in axial cross section.

In this case, wall 70 can optionally be dispensed with. Helical spring 50 can be housed inside the tubular skirt of the movable part forming a push-button or, in a variant, it can be disposed outside the pump chamber and not in contact with the fluid.

Clearly, the invention is not limited to the embodiments described above.

In particular, more than one lateral opening can be provided on duct 19, 19' or 19".

It is also possible to modify the shape of the stationary part, the movable part or the membrane of the pump depending on the nature of the fluid and of the dose to be dispensed.

What is claimed is:

1. A pump for mounting on a receptacle, comprising two parts which are movable with respect to each other defining between them a variable volume pump chamber, the first part comprising a wall defining a fluid inlet passage, via which the fluid contained in the receptacle can gain entry into the pump chamber, the second part comprising a wall defining a fluid outlet passage via which the fluid contained in the pump chamber can leave, the pump comprising a membrane having a first portion disposed on the outer side of the wall defining the inlet passage, such that pressure in the pump chamber applies said first portion to said wall to obstruct said inlet passage when the volume of the pump chamber is reduced, wherein the membrane comprises a second portion disposed on the inner side of the wall defining the outlet passage, such that an underpressure in the pump chamber applies said portion to said wall to obstruct said outlet passage when the volume of the pump chamber increases.

2. A pump according to claim 1, wherein the first part of the pump is stationary and integral with the receptacle.

3. A pump according to claim 1, wherein the membrane is integral with the first part of the pump and wherein the second portion of the membrane can be axially displaced with respect to the wall defining the outlet passage, said outlet passage being obstructed when the volume of the pump chamber increases.

4. A pump according to claim 1, wherein the first and second portions of the membrane are tubular.

5. A pump according to claim 1, wherein the first and second portions of the membrane form a cylinder.

6. A pump according to claim 5, wherein the cylinder is a symmetrical body of revolution.

7. A pump according to claim 1, wherein the wall defining the inlet passage is tubular and wherein the first portion of the membrane is disposed around said wall.

8. A pump according to claim 1, wherein the wall defining the outlet passage is tubular and wherein the second portion of the membrane is inserted inside this wall defining the outlet passage.

9. A pump according to claim 1, wherein the wall defining the outlet passage is a cylindrical body of revolution, as is the outer surface of the second portion of the membrane facing said wall defining the outlet passage.

10. A pump according to claim 1, wherein the wall defining the inlet passage is a cylindrical body of revolution and comprises at least one lateral opening, and wherein the inner surface of the first portion of the membrane facing said wall defining the inlet passage is a cylindrical body of revolution.

11. A pump according to claim 1, wherein the membrane comprises a transverse partition between its first and second portions.

12. A pump according to claim 11, wherein said transverse partition comes into axial bearing contact with the wall defining the inlet passage.

13. A pump according to claim 1, wherein a resilient return means is provided to return the second part of the pump to an initial position in which the volume of the pump chamber is a maximum.

14. A pump according to claim 13, wherein said resilient return means is formed in a single piece by molding the plastics material with the membrane.

15. A pump according to claim 14, wherein the resilient return means comprises an annular flange against which the wall defining the outlet passage can bear, and a transverse partition which can stretch elastically when the wall defining the outlet passage is displaced.

16. A pump according to claim 1, wherein the membrane comprises a portion which is a symmetrical body of revolution with an axial cross section in the shape of an H.

17. A pump according to claim 1, wherein the membrane comprises an L-shaped annular flange at its periphery, against which the wall defining the outlet passage comes into bearing contact.

18. A pump according to claim 1, wherein the membrane is integral with the second part of the pump and wherein the first part of the membrane can be axially displaced with respect to the wall defining the inlet passage while obstructing said inlet passage when the volume of the pump chamber reduces.

* * * * *